United States Patent
Zhu et al.

(10) Patent No.: US 10,109,393 B2
(45) Date of Patent: Oct. 23, 2018

(54) HALOGEN-FREE FLAME RETARDANT TPU COMPOSITION FOR WIRE AND CABLE

(75) Inventors: Journey Lu Zhu, Shanghai (CN); David Hong Fei Guo, Shanghai (CN); Lei Ying, Shanghai (CN); Bin Li, Shanghai (CN); Yongyong Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 821 days.

(21) Appl. No.: 14/233,074

(22) PCT Filed: Aug. 31, 2011

(86) PCT No.: PCT/CN2011/079163
§ 371 (c)(1),
(2), (4) Date: Jan. 15, 2014

(87) PCT Pub. No.: WO2013/029249
PCT Pub. Date: Mar. 7, 2013

(65) Prior Publication Data
US 2014/0234620 A1    Aug. 21, 2014

(51) Int. Cl.
*H01B 7/295* (2006.01)
*H01B 3/30* (2006.01)
*H01B 3/44* (2006.01)
*C08K 5/49* (2006.01)
*C08L 75/04* (2006.01)
*C08K 5/52* (2006.01)
*C08K 5/523* (2006.01)
*C08K 3/22* (2006.01)

(52) U.S. Cl.
CPC .............. *H01B 7/295* (2013.01); *C08K 5/49* (2013.01); *C08L 75/04* (2013.01); *H01B 3/302* (2013.01);
(Continued)

(58) Field of Classification Search
CPC ............. D06M 15/244; D06M 15/248; D06M 15/252; D06M 15/256; C08K 5/49;
(Continued)

(56) References Cited

U.S. PATENT DOCUMENTS

| 4,144,202 A | 3/1979 | Ashcraft et al. |
| 4,292,463 A | 9/1981 | Bow et al. |

(Continued)

FOREIGN PATENT DOCUMENTS

| CN | 101358028 A | 2/2009 |
| JP | 2000-322946 A | 11/2000 |

(Continued)

OTHER PUBLICATIONS

Polyolefin description; UL Prospectors website; www.ulprospectors.com; downloaded Oct. 2, 2016.*

*Primary Examiner* — Jennifer A Steele
(74) *Attorney, Agent, or Firm* — Husch Blackwell LLP

(57) ABSTRACT

The present disclosure provides a wire or cable comprising a flame retardant-free thermoplastic inner sheath and an outer sheath composition comprising, based on the weight of the composition, (a) 10 wt % to 90 wt % of a TPU based resin, (b) 5 wt % to 90 wt % of a metal hydrate, (c) 2 wt % to 50 wt % of a nitrogen-based phosphorus flame retardant, and (d) 2 wt % to 50 wt % liquid phosphate modifier, wherein the outer sheath is in contact with the insulation covering, and wherein the outer sheath has a thickness from greater than zero to 0.8 mm.

9 Claims, 1 Drawing Sheet

(52) U.S. Cl.
CPC ............. *H01B 3/441* (2013.01); *C08K 5/523* (2013.01); *C08K 5/5205* (2013.01); *C08K 2003/2227* (2013.01); *C08K 2201/014* (2013.01); *Y10T 428/2942* (2015.01)

(58) Field of Classification Search
CPC ...... C08K 2003/2227; C08K 2201/014; C08K 5/5205; C08K 5/523; C08L 29/04; C08L 75/04; C08L 75/08; D01F 8/06; D01F 8/16; H01B 3/441; H01B 7/0208; H01B 7/0216; H01B 7/0225; H01B 7/295; Y10T 428/2938; Y10T 428/2942
See application file for complete search history.

(56) References Cited

U.S. PATENT DOCUMENTS

| | | | |
|---|---|---|---|
| 5,246,783 A | 9/1993 | Spenadel et al. | |
| 6,404,971 B2 | 6/2002 | Mehl | |
| 6,496,629 B2 | 12/2002 | Ma et al. | |
| 6,714,707 B2 | 3/2004 | Rossi et al. | |
| 2003/0121694 A1* | 7/2003 | Grogl | H01B 3/441 174/113 R |
| 2003/0141097 A1* | 7/2003 | Belli | H01B 3/441 174/110 R |
| 2008/0105454 A1* | 5/2008 | Morioka | H01B 3/441 174/120 SR |
| 2010/0147549 A1 | 6/2010 | Shiina | |

FOREIGN PATENT DOCUMENTS

| | | | |
|---|---|---|---|
| JP | 2004-127565 A | 4/2004 | |
| WO | 2010/012136 A1 | 2/2010 | |
| WO | 2010/148574 A1 | 12/2010 | |
| WO | WO 2010148574 A1 * | 12/2010 | ............. C08L 61/14 |
| WO | 2011/050520 A1 | 5/2011 | |
| WO | 2011/069301 A1 | 6/2011 | |
| WO | 2011/072458 A1 | 6/2011 | |

* cited by examiner

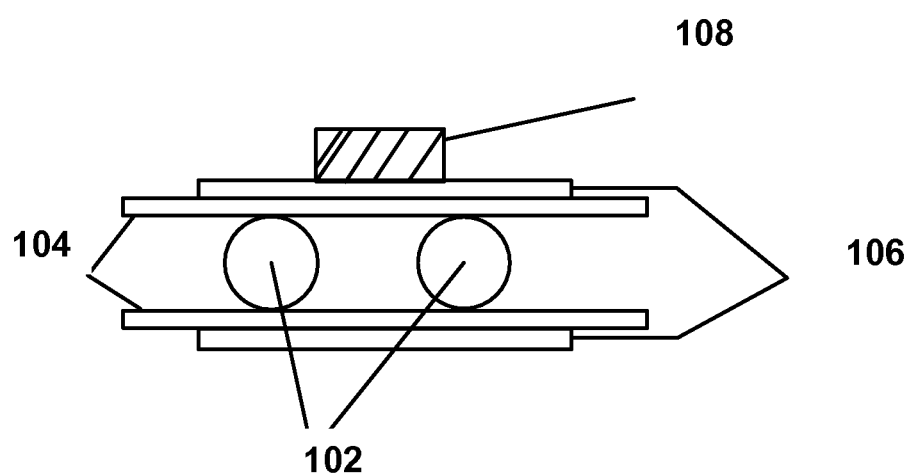

HALOGEN-FREE FLAME RETARDANT TPU COMPOSITION FOR WIRE AND CABLE

CROSS REFERENCE TO RELATED APPLICATION

The present application is the national phase of PCT Patent Application No. PCT/CN2011/079163 filed Aug. 31, 2011, the entire content of which is incorporated by reference herein.

BACKGROUND OF THE INVENTION

1. Field of the Invention

The invention relates to cable having an outer sheath comprising a thermoplastic polyurethane (TPU) composition. In one aspect the invention relates to a cable outer sheath comprising a halogen-free, flame retardant TPU composition which include a nitrogen-based phosphorus flame retardant and a metal hydrate.

2. Description of the Related Art

TPU compositions can have a broad range of flexibility. They can be fabricated by a wide variety of methods from injection molding to extrusion to blow molding. They also offer performance benefits of clarity, abrasion resistance, chemical and hydrocarbon resistance, and load-bearing and tensile strength. Accordingly, they cover many applications which require flame retardancy.

The traditional flame retardants used in TPU compositions are halogen-based, i.e., they contain bromine, chlorine etc. However, due to the ever present concerns for the environment and safety, halogen-free flame retardants are now favored but these can pose a challenge for TPU compositions. Conventional and readily available halogen-free flame retardants, e.g., those based on organic phosphates such as resorcinol bis(diphenyl phosphate) (RDP) and bisphenol-A bis(diphenyl phosphate) (BPADP), do not produce a flame retardant TPU composition that exhibits good smoke suppression. Of continuing interest to the TPU industry is a halogen-free TPU composition that exhibits both good mechanical properties and flame retardancy.

BRIEF DESCRIPTION OF THE DRAWINGS

FIG. 1 is a schematic of an assembly used for the non-migration tests.

SUMMARY OF THE INVENTION

In one embodiment the invention is a cable comprising a flame retardant-free thermoplastic inner sheath and an outer sheath composition comprising, based on the weight of the composition,
  (a) 10 wt % to 90 wt % of a TPU based resin,
  (b) 5 wt % to 90 wt % of a metal hydrate,
  (c) 2 wt % to 50 wt % of a nitrogen-based phosphorus flame retardant, and
  (d) 2 wt % to 50 wt % liquid phosphate modifier,
wherein the outer sheath is in contact with the thermoplastic inner sheath, and wherein the outer sheath has a thickness from 0.1 mm to 0.8 mm.

In one embodiment, the outer sheath composition further comprises one or more additives or fillers such as an antioxidant, a UV-stabilizer, processing aids and/or a metal oxide, e.g., titanium dioxide.

In all the embodiments, the total percentages of all the components in the outer sheath composition are 100 wt %.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation sheath or a protective outer sheath. Typically, a cable is two or more wires or optical fibers bound together, typically in a common insulation inner sheath and/or protective outer sheath. The individual wires or fibers inside the outer sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering, made from the compositions of this invention.

A "thermoplastic" material is a linear or branched polymer which can be repeatedly softened and made flowable when heated and returned to a hard state when cooled to room temperature. It generally has an elastic modulus greater than 10,000 psi (68.95 MPa) using the method of ASTM D638-72. In addition, thermoplastics can be molded or extruded into articles of any predetermined shape when heated to the softened state.

HFFR TPU Composition

The present disclosure provides a cable outer sheath made from a halogen-free flame retardant (HFFR) thermoplastic polyurethane (TPU) composition. The HFFR TPU composition comprises (a) TPU, (b) metal hydrate, (c) nitrogen-based phosphorus flame retardant and (d) liquid phosphate modifier.

(A) Thermoplastic Polyurethane (TPU)

The thermoplastic polyurethane used in the practice of this invention is the reaction product of a polyisocyanate (typically a di-isocyanate), one or more polymeric diol(s), and optionally one or more difunctional chain extender(s). "Thermoplastic" as here used describes a polymer that (1) has the ability to be stretched beyond its original length and retract to substantially its original length when released, and (2) softens when exposed to heat and returns to substantially its original condition when cooled to room temperature.

The TPU may be prepared by the prepolymer, quasi-prepolymer, or one-shot methods. The isocyanate forms a hard segment in the TPU and may be an aromatic, an aliphatic, or a cycloaliphatic isocyanate and combinations of two or more of these compounds. One nonlimiting example of a structural unit derived from a di-isocyanate (OCN—R—NCO) is represented by formula (I):

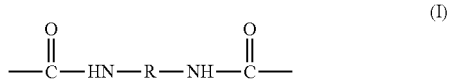

in which R is an alkylene, cycloalkylene, or arylene group. Representative examples of these di-isocyanates can be found in U.S. Pat. Nos. 4,385,133, 4,522,975 and 5,167,899. Nonlimiting examples of suitable di-isocyanates include 4,4'-di-isocyanatodipheny-1-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

In one embodiment the TPU is at least one of polyether-based or polyester-based polyurethane. TPU compositions based on polyether-based polyurethane are preferred.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and commercial thermoplastic polyurethanes available from Bayer, Huntsman, the Lubrizol Corporation and Merquinsa.

The TPU component of the compositions of this invention can comprise one or more thermoplastic polyurethanes and, optionally, include one or more additional thermoplastic, halogen-free polymers including, but not limited to, ethylene vinyl acetate (EVA), polyethylene, polypropylene, ethylene- or propylene copolymer, styrenic block copolymer, and the like. These other polymers can be dispersed in, discontinuous or co-continuous with the TPU resin phase of the composition.

If present, then the other polymers are typically present in an amount of 0.1 wt % to 50 wt %, more typically 0.1 wt % to 15 wt % and even more typically 0.1 wt % to 10 wt %, wt %, based on the combined weight of the TPU component and the other polymers.

The TPU typically comprises at least 10 wt %, more typically at least 20 wt % and even more typically at least 30 wt %, percent by weight (wt %) of the HFFR TPU composition. The TPU typically comprises not more than 90 wt %, more typically not more than 80 wt % and even more typically not more than 50 wt %, based on the total weight of the HFFR TPU composition.

(B) Metal Hydrate

Suitable metal hydrates for use in the practice of this invention include, but are not limited to, aluminum trihydroxide (also known as ATH or aluminum trihydrate) and magnesium hydroxide (also known as magnesium dihydroxide). The metal hydrate may be naturally occurring or synthetic, and they can be used alone or in combination with one another and/or with other inorganic flame retardants, e.g., calcium carbonate, silica, etc., typically in minor amounts.

The metal hydrate typically comprises at least 5 wt %, more typically at least 10 wt % and even more typically at least 20 wt %, based on the total weight of the HFFR TPU composition. The metal hydrate typically comprises not more than 90 wt %, more typically not more than 60 wt % and even more typically not more than 40 wt %, based on the total weight of the HFFR TPU composition.

(C) Nitrogen-Based Phosphorous Flame Retardant

The HFFR TPU composition also includes a nitrogen-based phosphorus flame retardant. The nitrogen-based phosphorus flame retardant also typically includes one or more components contributing nitrogen either as a combined phosphorus-nitrogen species or as a separate component.

Nitrogen-based phosphorus flame retardants used in the practice of this invention include, but are not limited to, phosphorus ester amides, phosphoric acid amides, phosphonic acid amides, phosphinic acid amides, and melamine and melamine derivatives, including melamine polyphosphate, melamine pyrophosphate and melamine cyanurate and mixtures of two or more of these materials.

Ammonium and piperazine polyphosphate and pyrophosphates are widely used, often in combination with flame retardant additives, such as melamine derivatives. In one embodiment the nitrogen-based phosphorus flame retardant comprises AMFINE FP-2100J, a phosphorus-nitrogen based flame retardant mixture from Adeka Corporation. In one embodiment the nitrogen-based phosphorus flame retardant comprises BUDIT 3167, a phosphorus-nitrogen based flame retardant mixture from Budenheim Corporation. The FP-2100J and BUDIT 3167 typically provide good intumescent burn performance for TPU and other resin systems.

The nitrogen-based phosphorus flame retardant comprises at least 1 wt %, more typically at least 2 wt % and even more typically at least 5 wt %, based on the total weight of the HFFR TPU composition. The nitrogen-based phosphorus flame retardant typically comprises not more than 30 wt %, more typically not more than 20 wt % and even more typically not more than 10 wt %, based on the total weight of the HFFR TPU composition.

(D) Liquid Phosphate Modifier

The HFFR TPU composition optionally comprises a liquid phosphate modifier. The incorporation of liquid phosphate modifiers into the HFFR TPU compositions greatly reduces strain or scratch whitening while providing overall synergistic property advantages. These liquid phosphate modifiers have very good compatibility with the HFFR TPU compositions and have burn synergy with the nitrogen-based phosphorus flame retardant. As here used, "liquid phosphate modifier" means a phosphate flame retardant that is either a liquid at ambient conditions or is a low-melting solid at ambient conditions but with a melting temperature of less than 150° C.

Examples of suitable liquid phosphate modifiers include high molecular weight resorcinol diphenyl phosphate (RDP), bisphenol A diphosphate (BDP), triphenol phosphate (TPP), tributoxyethyl phosphate (TBEP), tricresyl phosphate (TCP), resorcinol bis(xylenol phosphate (XDP) and mixtures of two or more of these compounds.

When present, the liquid phosphate modifier typically comprises at least 1 wt %, more typically at least 2 wt % and even more typically at least 3 wt %, based on the total weight of the HFFR TPU composition. The liquid phosphate typically comprises not more than 20 wt %, more typically not more than 15 wt % and even more typically not more than 10 wt %, based on the total weight of the HFFR TPU composition.

In one embodiment, the liquid phosphate modifier is BDP. BDP is a commercially available, light-colored, high-boiling, non-flammable, low viscous and low acidic flame retardant additive known for use in flexible and rigid polyurethane and polyisocyanurate foam, unsaturated polyester resins, polyvinyl chloride, adhesives, elastomers, cellulose acetate, nitrocellulose, epoxy resins and other resins. BDP may exist as a single molecule or as an oligomer, i.e., a polymer-like material having only a few repeating units. The oligomeric form of BDP generally has an average of two or more phosphate and/or phosphonate ester units per molecule.

Additives and Fillers

The HFFR TPU compositions of this invention can, optionally, also contain additives and/or fillers. Representative additives include, but are not limited to, antioxidants, processing aids, colorants, ultraviolet stabilizers (including UV absorbers), antistatic agents, anti-drip agents, nucleating agents, slip agents, plasticizers, lubricants, viscosity control agents, tackifiers, anti-blocking agents, surfactants, extender oils, acid scavengers, and metal deactivators. If present, these additives are typically used in a conventional manner and in conventional amounts, e.g., from 0.01 wt % or less to 10 wt % or more, based on the total weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, meta-barium borate, zinc borate and meta-zinc borate; metal anhydride such as aluminum anhydride; clay such as diatomite, kaolin and montmorilonite; huntite; celite; asbestos; ground minerals; and lithopone. If present, these fillers are typically used a conventional manner and in conventional amounts, e.g., from 5 wt. % or less to 50 wt. % or more based on the weight of the composition.

In one embodiment the HFFR TPU composition of the invention further comprises an anti-dripping agent. Examples include without limitation one or more of triglycidyl isocyanurate, epoxidized novolac resin, and fluoro-based resins such as polytetrafluoroethylene, copolymers of tetrafluoroethylene and hexafluoropropylene, fluorinated carbon resins of tetrafluoroethylene and perfluoroalkylvinylether, polyvinylidenefluoride, and the like.

If present, the anti-dripping agent typically comprises at least 0.1 wt %, more typically at least 0.2 wt % and even more typically at least 0.4 wt %, based on the total weight of the HFFR TPU composition. If present, the anti-dripping agent typically comprises not more than 10 wt %, more typically not more than 8 wt % and even more typically not more than 5 wt %, based on the total weight of the HFFR TPU composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2,2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6, -tetramethyl-1-piperidineethanol and 90 wt % of N,N'''-[1,2-Ethanediylbis[[[4,6-bis[butyl(1,2,2,6,6-pentamethyl-4-piperidinyl)amino]-1,3,5-traizin-2-yl]imino]-3,1-propanediyl]]bis[N'N''-dibutyl-N'N''-bis(1,2,2,6,6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

Examples of antioxidants include, but are not limited to, hindered phenols such as tetrakis[methylene(3,5-di-tert-butyl-4-hydroxyhydro-cinnamate)]methane; bis[(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; varioussiloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine anti-degradants or stabilizers. Antioxidants can be used, for example, in amounts of 0.1 to 5 wt % based on the weight of the composition.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding/Fabrication

Compounding of the compositions of this invention can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The compounding temperature of the TPU with the metal hydrate, nitrogen-based phosphorus flame retardant and optional liquid phosphorus modifier and additive packages is typically from 120 to 220° C., more typically from 160 to 200° C. The various components of the final composition can be added to and compounded with one another in any order, or simultaneously, but typically the TPU is first compounded with one or more of the flame retardants before it is compounded with the additives.

In some embodiments the additives are added as a pre-mixed masterbatch. Such masterbatches are commonly formed by dispersing the additives, either separately or together, a small amount of the TPU or, if the TPU is used in combination with another resin, e.g., a polyethylene or polypropylene, with a small amount of the other resin. Masterbatches are conveniently formed by melt compounding methods.

Articles of Manufacture

In an embodiment, the cable of this invention comprises a flame retardant-free thermoplastic inner sheath and an outer sheath comprising the HFFR TPU composition, wherein the outer sheath is in contact with the thermoplastic inner sheath. The outer sheath has a thickness greater than zero to 0.8 mm, preferably 0.2 to 0.6 mm. The thermoplastic inner sheath may comprise a polyolefin, preferably polypropylene.

The HFFR TPU composition of this invention can be applied to a cable in known amounts and by known methods (for example, with the equipment and methods described in U.S. Pat. Nos. 5,246,783 and 4,144,202).

Typically, the HFFR TPU composition is prepared in a reactor-extruder equipped with a cable-coating die and after the components of the composition are formulated, the HFFR TPU composition is extruded over the thermoplastic inner sheath of the cable as the cable is drawn through the die. The outer sheath is then typically subjected to a cure period which takes place at temperatures from ambient up to but below the melting point of the composition until the article has reached the desired degree of crosslinking. Cure may begin in the reactor-extruder.

The cable outer sheath comprising HFFR TPU compositions of this invention exhibits satisfactory flame resistance performance without using halogenated flame retardants and thus remove environmental and health concerns over combustion of the compositions.

The invention is described more fully through the following examples. Unless otherwise noted, all parts and percentages are by weight.

Specific Embodiments

Materials

The TPU used in these examples is ESTANE™ 58219, a polyether thermoplastic polyurethane available from Lubrizol Advanced Materials. Before using, the TPU samples are pre-dried at 90° C. for at least 6 hours under vacuum. ELVAX® 265, ethylene vinyl acetate copolymer, is acquired from Dupont and used as received. BDP is obtained from Adeka with a grade name of FP600 and used as received. Nitrogen-based phosphorus flame retardants FP2100J is acquired from Adeka and BUDIT® 3167 is acquired from Budenheim. Aluminum trihydrate H42M is obtained from Showa Kako, and it is pre-dried at 100° C. for 6 hours under vacuum.

DEN431, a solvent-free, epoxidized novolac is available from The Dow Chemical Company. Titanium oxide (TiO2) is acquired from DuPont as R350. The anti-oxidant IRGANOX® 1010 and processing stabilizer IRGAFOS® 168 are acquired from Ciba Specialty Chemicals. The UV-stabilizer is TINUVIN 866 is acquired also from Ciba Specialty Chemicals. The color masterbatch Clariant MB is from Clariant.

Preparation

The compositions shown in Table A are prepared on a twin screw extruder and evaluated for extrusion characteristics and key properties. Both Comparative Examples (CEs) and Inventive Examples (IEs) are shown. The following steps are used in the material preparation and evaluation. In a 50 L high speed mixer, the TPU resin and EVA and a portion of the aluminum oxide trihydrate filler is added and mixed for 10 seconds. The remaining aluminum oxide trihydrate is then added to the mixture, together with the nitrogen-based phosphorus flame retardant (FP2100J or Budit 3167) and, if present, the liquid phosphate modifier (BDP). Pre-heated epoxidized novolac is gradually spooned into the mixer. Then the Irganox 1010 and Irgafos 168 additives are added.

Once all the components are added to the mixer, they are mixed under 1800 RPM for 1 minute. The pre-mixed blends are then extruded by a twin screw extruder with a barrel temperature of 190° C., a screw diameter of 40.0 mm and an L/D at 38.6, with an output about 60 kg/hr. Finally, the resulting pellets dried under 120° C. for 6 hrs.

Cables are extruded on a wire coating machine with a screw diameter of 70 mm and L/D at 21.4. The TPU composite was extruded as jacketing/sheath with a wall thickness of 0.4 mm. The insulation core is a standard A58 data cable core. Line speed of the extrusion is 80 m/min.

Characterization

The tensile strength at break and the elongation at break are measured according to ASTM D-638 at room temperature and a speed of 500 mm/min. The tensile testing is performed on an INSTRON 5565 Tensile Tester. The specimen for the tensile tests are compression molded plaques prepared at a 185° C. molding temperature, using a low pressure cycle to facilitate melting, followed by exposure to high pressure to shape the 1.4×200×200 mm plaques. The mold is held at high pressure (15 MPa) and cooled to room temperature over a period of 8 min to solidify the plaques.

VW-1 testing is conducted in a VW-1 chamber according to UL 1581-2001. Five specimen are tested for each sample. Any of the following phenomena will result in a rating of "not pass": (1) the cotton under the specimen is ignited; (2) the flag is burned out; or (3) dripping with flame is observed.

Heat deformation testing is conducted according to UL 1581-2001. For each formulation, two parallel sample plaques are placed into an oven and preheated at 150° C. for one hour. The preheated samples are then pressed with the same loading at 150° C. for one hour. After that the pressed samples, without removal of the weights, are placed in an ASTM room with setting temperature at 23° C. for an additional hour. The changes in the thickness of the sample plaques are recorded and the heat deformation ratio is calculated according to HD %=$(D_0-D_1)/D_0$*100%, wherein $D_0$ represents the original sample thickness and $D_1$ represents the sample thickness after the deformation process. Calculated deformation ratios for the two parallel samples are averaged.

Non-migration tests are conducted with an assembly shown in FIG. 1. Two cables 102 composed of a composition in accordance with this invention are sandwiched between two plastic panels 104, which are further sandwiched between two glass panels 106 with a loading of 500 g 108 on top of the assembly. The plastic panels employed are PC, ABS, and PC/ABS. The cables are tested on each type of the three panels (i.e., three times—once each with each type of panel). The diameters of the cables are not critical. Cables having diameters of about 0.5 mm to about 10 mm can be used. The dimensions of each panel are 9 cm×6 cm. The two cables protrude past the pressing plate (width 60 mm). The assembly is then stored at 50° C., 80% RH for 48 hr. Then the plastic panels are cleaned with 90% ethanol. For the purposes of this disclosure, a composition passes the non-migration test if no residue or etching is observed on the PC, ABS, and PC/ABS panels after the test, as determined by visual inspection.

TABLE A

| Formulations and Properties of CE 1-2 and IE 1-4. | | | | | | |
|---|---|---|---|---|---|---|
| | CE 1 | CE 2 | IE 1 | IE 2 | IE 3 | IE 4 |
| Formulations | | | | | | |
| TPU 58219 | 31.4 | 31.4 | 31.4 | 31.4 | 31.4 | 31.4 |
| EVA | 5 | 5 | 5 | 5 | 5 | 5 |
| ATH | 40 | — | 35 | 30 | 30 | 20 |
| BDP | 10 | 10 | 10 | 10 | 10 | 10 |
| FP2100J | — | 40 | 5 | 10 | — | 20 |
| Budit 3167 | — | — | — | — | 10 | — |
| DEN 438 | 1 | 1 | 1 | 1 | 1 | 1 |
| Irgafos 168 | 0.1 | 0.1 | 0.1 | 0.1 | 0.1 | 0.1 |
| Irganox 1010 | 0.5 | 0.5 | 0.5 | 0.5 | 0.5 | 0.5 |
| TiO$_2$ | 9 | 9 | 9 | 9 | 9 | 9 |

TABLE A-continued

Formulations and Properties of CE 1-2 and IE 1-4.

|  | CE 1 | CE 2 | IE 1 | IE 2 | IE 3 | IE 4 |
|---|---|---|---|---|---|---|
| UV886 | 1 | 1 | 1 | 1 | 1 | 1 |
| Clariant MB | 2 | 2 | 2 | 2 | 2 | 2 |
| Sum | 100 | 100 | 100 | 100 | 100 | 100 |
| Properties |  |  |  |  |  |  |
| Tensile Elongation, % | 237 ± 14 | 183 ± 9 | 206 ± 19 | 219 ± 17 | 177 ± 24 | 193 ± 8 |
| Tensile Strength, MPa | 11.5 ± 0.2 | 10.3 ± 0.1 | 12.0 ± 0.2 | 11.8 ± 0.3 | 10.0 ± 0.1 | 11.7 ± 0.4 |
| Heat Deformation, % | 24.6 | 38.1 | 27.3 | 21.5 | 22.7 | 34.9 |
| Non-migration test | Fail | Pass | Pass | Pass | Pass | Pass |
| VW-1 | Fail | Fail | Pass | Pass | Pass | Pass |
| VW-1 (Pass/Total) | 2/5 | 3/5 | 5/5 | 5/5 | 5/5 | 5/5 |
| Drip/Ignite Cotton | Y | N | N | N | N | N |
| Flag Burnt Area ≥25% | N | Y | N | N | N | N |

In contrast to the Inventive Examples, CE 1 fails to comprise a nitrogen-based phosphorus flame retardant and CE 2 fails to comprise a metal hydrate.

It is very challenging for a cable jacketing to pass the VW-1 test when the cable core is made from a polypropylene without a flame retardant additive and when the cable jacketing is very thin, 0.4 mm. CE 1 and CE 2, which have only nitrogen-based phosphorus flame retardant or metal hydrate, failed the VW-1 test.

Inventive Examples 1-4 are surprisingly successful in the VW-1 test with IE 1-4 having passed 5 out of 5 tests, in contrast to Comparative Examples 1-2 which pass only 2 and 3 out of five, respectively. Only the Inventive Examples pass the non-migration test, have a flag burnt area less than 25%, and do not drip or ignite the cotton while having acceptable values for tensile strength, elongation and deformation.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A cable consisting of:
   a wire within a flame retardant-free thermoplastic inner sheath consisting of polypropylene; and
   an outer sheath composition consisting of, based on the total weight of the composition,
   (a) 10 wt % to 90 wt % of a TPU based resin,
   (b) 5 wt % to 90 wt % of a metal hydrate selected from the group consisting of aluminum trihydrate and magnesium hydroxide,
   (c) 2 wt % to 50 wt % of a nitrogen-based phosphorus flame retardant,
   (d) 2 wt % to 15 wt % of a liquid phosphate modifier,
   (e) optionally, a thermoplastic halogen-free polymer,
   (f) optionally, an additive, and
   (g) optionally, a filler;
   wherein the outer sheath is in contact with the inner sheath,
   wherein the outer sheath has a thickness from 0.2 to 0.6 mm; and
   the cable passes the VW-1 test and the non-migration test.

2. The cable of claim 1 wherein the outer sheath consists of
   (a) 30 wt % to 50 wt % of a TPU based resin,
   (b) 20 wt % to 40 wt % of a metal hydrate,
   (c) 5 wt % to 20 wt % of a nitrogen-based phosphorus flame retardant, and
   (d) 3 wt % to 10 wt % of a liquid phosphate modifier
   (e) optionally, the thermoplastic halogen-free polymer,
   (f) optionally, the additive, and
   (g) optionally, the filler.

3. The cable of claim 1 wherein the metal hydrate is aluminum trihydrate.

4. The cable of claim 1 wherein the nitrogen-based phosphorus flame retardant is selected from the group consisting of ammonium polyphosphate (APP), melamine polyphosphate (MPP), and piperazine pyrophosphate.

5. The cable of claim 1 wherein the liquid phosphate modifier is selected from the group consisting of resorcinol diphenol phosphate (RDP), bisphenol A diphosphate (BDP), triphenol phosphate (TPP), tributoxyethyl phosphate (TBEP), and resorcinol bis(xylenol phosphate) (XDP).

6. The cable of claim 1 wherein the outer sheath composition further comprises the thermoplastic halogen-free polymer, which is an epoxidized novolac.

7. A cable consisting of:
   a wire within a flame retardant-free thermoplastic inner sheath consisting of polypropylene; and
   an outer sheath composition consisting of, based on the total weight of the composition,
   (a) 30 wt % to 50 wt % of a TPU based resin,
   (b) 20 wt % to 40 wt % of a metal hydrate selected from the group consisting of aluminum trihydrate and magnesium hydroxide,
   (c) 5 wt % to 20 wt % of a nitrogen-based phosphorus flame retardant selected from the group consisting of ammonium polyphosphate (APP), piperazine polyphosphate, melamine polyphosphate (MPP), ammonium pyrophosphate, piperazine pyrophosphate, melamine pyrophosphate, and combinations thereof,
   (d) 3 wt % to 10 wt % of a liquid phosphate modifier selected from the group consisting of resorcinol diphenol phosphate (RDP), bisphenol A diphosphate (BDP), triphenol phosphate (TPP), tributoxyethyl phosphate (TBEP), tricresyl phosphate (TCP), resorcinol bis(xylenol phosphate) (XDP), and combinations thereof,
   (e) 0.1 wt % to 10 wt % epoxidized novolac resin,
   (f) optionally, an additive, and
   (g) optionally, a filler;
   wherein the outer sheath is in contact with the inner sheath, and wherein the outer sheath has a thickness of 0.4 mm, the outer sheath composition having a heat deformation from 21.5% to 34.9%; and wherein the cable passes the VW-1 test and the non-migration test.

8. The cable of claim 7 wherein the metal hydrate is aluminum trihydrate.

9. The cable of claim 7 wherein the liquid phosphate modifier is bisphenol A diphosphate (BDP).

* * * * *